US012712381B2

(12) United States Patent
Xu et al.

(10) Patent No.: US 12,712,381 B2
(45) Date of Patent: Aug. 18, 2026

(54) MODULAR STATIC TRANSFER SWITCH WITH WIDE-BANDGAP TRANSISTORS

(71) Applicant: ABB Schweiz AG, Baden (CH)

(72) Inventors: Chunmeng Xu, Raleigh, NC (US); Veerakumar Bose, Henrico, VA (US); Harish Suryanarayana, Apex, NC (US); Govind S. Chavan, Garner, NC (US); Pietro Cairoli, Cary, NC (US)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 18/530,778

(22) Filed: Dec. 6, 2023

(65) Prior Publication Data

US 2025/0192604 A1 Jun. 12, 2025

(51) Int. Cl.
*H02J 9/06* (2006.01)
*H02J 3/001* (2026.01)
*H02J 3/007* (2026.01)

(52) U.S. Cl.
CPC .............. *H02J 9/068* (2020.01); *H02J 3/001* (2020.01); *H02J 3/007* (2020.01)

(58) Field of Classification Search
CPC ............. H02J 9/068; H02J 3/001; H02J 3/007
See application file for complete search history.

(56) References Cited

U.S. PATENT DOCUMENTS 6,465,911 B1 10/2002 Takeda et al.
7,459,804 B2 12/2008 Marwali et al.
7,589,438 B2 9/2009 Galm
8,508,890 B2 8/2013 Zheng et al.
10,734,834 B2 8/2020 Pan et al.
11,018,666 B1 5/2021 Du et al.
11,469,757 B2 10/2022 Cairoli et al.
11,489,333 B2 11/2022 Song et al.
2015/0035358 A1 2/2015 Linkhart et al.
2018/0331680 A1 11/2018 Wang et al.
2020/0358309 A1 11/2020 Ferguson
(Continued)

OTHER PUBLICATIONS

European Patent Office, International Search Report in International Patent Application No. PCT/IB2024/062282, 4 pp. (Apr. 11, 2025).
(Continued)

*Primary Examiner* — Daniel Cavallari
(74) *Attorney, Agent, or Firm* — Fitch Even Tabin & Flannery LLP

(57) ABSTRACT

A modular static transfer switch (STS) assembly comprises a semiconductor powertrain constructed with wide-bandgap transistors. A first input of the STS assembly is electrically coupled to a first power source and a second input of the STS assembly is electrically coupled to a second power source. An output of the STS assembly is electrically coupled to a load, wherein the load is powered using the first power source via the STS modular assembly. A galvanic isolator like relay or contactor or breaker or fuse disconnects any faulty semiconductor powertrain. The STS also comprises a controller to execute the transfer of power supplied to the load from the first power source to the second power source by electrically decoupling the first power source from the load, verifying that the first power source is disconnected from the load, and providing instructions to electrically couple the second power source to the load.

11 Claims, 12 Drawing Sheets

(56) References Cited

U.S. PATENT DOCUMENTS

2023/0155368 A1 5/2023 Du et al.

OTHER PUBLICATIONS

European Patent Office, Written Opinion in International Patent Application No. PCT/IB2024/062282, 6 pp. (Apr. 11, 2025).

Cheng et al., "Design of an Impulse Commutation Bridge for the Solid-State Transfer Switch," *IEEE Transactions on Industry Applications*, 44(4): 1249-1258 (Jul.-Aug. 2008).

Meyer et al., "Solid-State Circuit Breaker Based on Active Thyristor Topologies," *IEEE Transactions on Power Electronics*, 21(2): 450-458 (Mar. 2006).

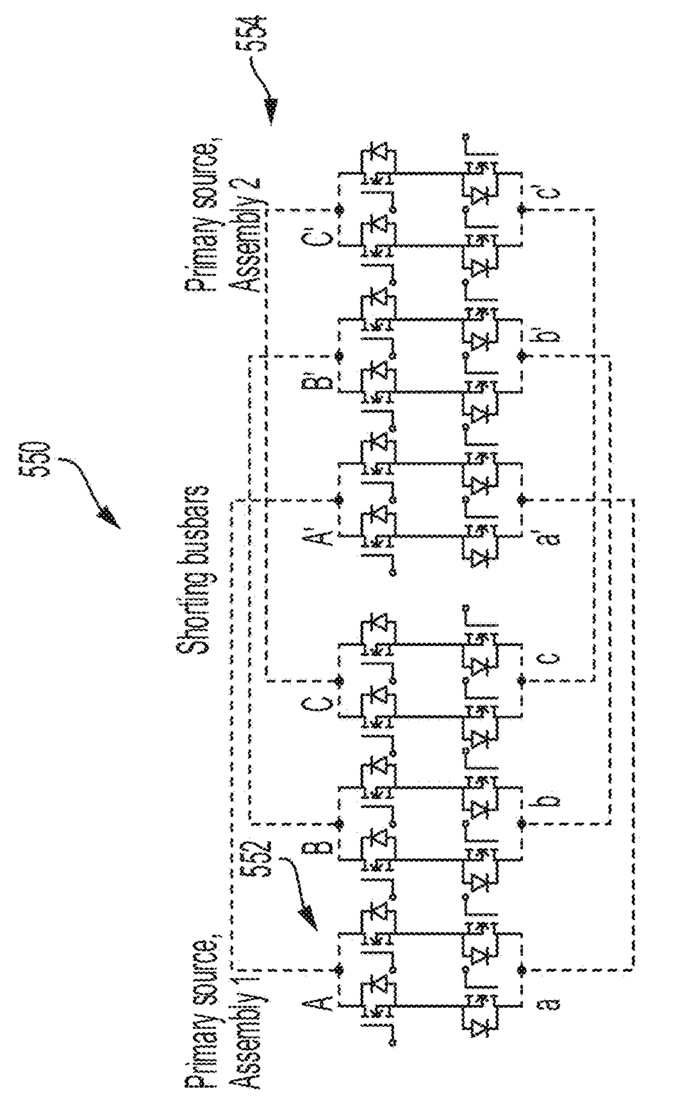
FIG. 5
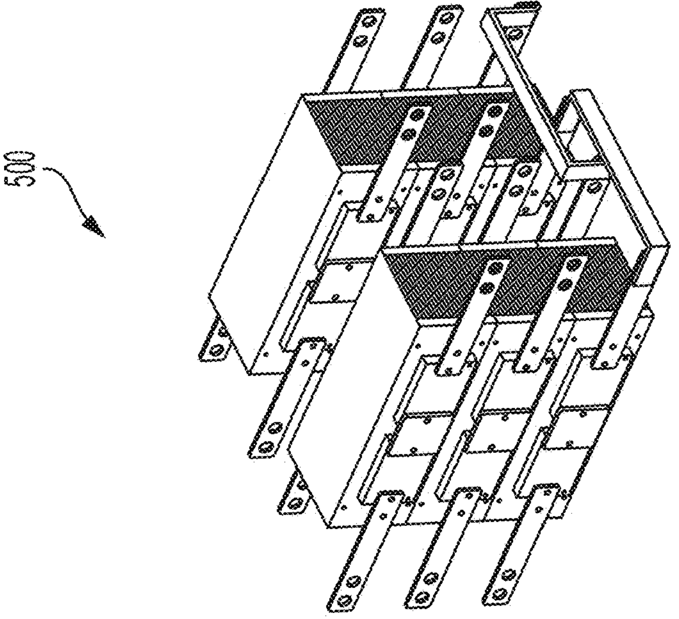

MODULAR STATIC TRANSFER SWITCH WITH WIDE-BANDGAP TRANSISTORS

FIELD

The present disclosure relates to a modular static transfer switch. In particular, the present disclosure relates to a modular static transfer switch implemented using wide-bandgap semiconductor transistors.

BACKGROUND

Existing static transfer switches (STS) lack modularity. In order to make STS products for different current ratings, such as 200 A/250 A, 400 A, and 600 A requires totally different thyristor power modules and heatsink assemblies. The different STS designs require a large inventory of parts in production and service sites, which creates a large logistics and supply chain burden. Furthermore, the existing selection of semiconductor devices in STS, primarily thyristors, are not suitable for parallel connections. Thyristors are prone to thermal runaways because of their negative temperature coefficient, meaning the conduction voltage drop decreases with an increased junction temperature. When two thyristors are connected in parallel, the hotter thyristor will draw more current and become even hotter and eventually damaged. Moreover, thyristors are half-controlled semiconductors that cannot be turned off before external current reversal. This turn-off delay is not desired in the next-generation mission-critical systems.

SUMMARY

A first aspect of the present disclosure provides a modular static transfer switch (STS) assembly. The modular STS assembly comprises at least one semiconductor powertrain constructed with wide-bandgap transistors, a first input of the modular STS assembly electrically coupled to a first power source and a second input of the modular STS assembly electrically coupled to a second power source, an output of the modular STS assembly electrically coupled to a load, wherein the load is powered using the first power source via the STS modular assembly, a galvanic isolator like relay or contactor or breaker or fuse to disconnect any faulty semiconductor powertrain, and a controller to execute the transfer of power supplied to the load from the first power source to the second power source. The controller is configured to: provide instructions to electrically decouple the first power source from the load, verify that the first power source is disconnected from the load, and provide instructions to electrically couple the second power source to the load.

According to an implementation of the first aspect, the at least one semiconductor powertrain comprises two wide-bandgap transistors in an anti-series connection, and wherein the wide-bandgap transistors comprise at least one of MOSFETs, JFETs, IGBTs, GITs, HEMTs, FinFETs.

According to an implementation of the first aspect, the first power source is connected to a first terminal of a first wide-bandgap transistor of the at least one power train via the first input, the second power source is connected to a first terminal of a second wide-bandgap transistor of the at least one power train via the second input, and the output of the modular STS assembly is connected to a second terminal of the first wide-bandgap transistor and a second terminal of the second wide-bandgap transistor.

According to an implementation of the first aspect, the modular static transfer switch assembly further comprises a second semiconductor powertrain constructed with wide-bandgap transistors, wherein the second semiconductor powertrain comprises two wide-bandgap transistors in an anti-series connection.

According to an implementation of the first aspect, the at least one semiconductor power train and the second semiconductor powertrain are connected in parallel.

According to an implementation of the first aspect, the at least one semiconductor power train is connected to the first power source and the second semiconductor powertrain is connected to the second power source.

According to an implementation of the first aspect, the at least one semiconductor powertrain connected in parallel to the second semiconductor powertrain is a first STS unit, and further comprises: a second STS unit, wherein the second STS unit comprises a third semiconductor power train and a fourth semiconductor power train, wherein the third semiconductor powertrain is connected to the at least one semiconductor powertrain and the fourth semiconductor power train is connected to the second semiconductor powertrain.

According to an implementation of the first aspect, the at least one semiconductor powertrain connected in parallel to the second semiconductor powertrain is a first STS unit, and further comprising: a second STS unit, wherein the second STS unit comprises a third semiconductor power train and a fourth semiconductor power train, wherein the third semiconductor powertrain is connected to a second phase of the first power source and the fourth semiconductor power train is connected to the second phase of the second power source.

According to an implementation of the first aspect, the at least one semiconductor power train and the second semiconductor powertrain are connected in series.

According to an implementation of the first aspect, the at least one semiconductor powertrain comprises one or more four quadrant or bidirectional wide-bandgap transistors, and wherein the wide-bandgap transistors comprise at least one of MOSFETs, JFETs, IGBTs, GITs, HEMTs, FinFETs.

According to an implementation of the first aspect, the modular STS has N+1 parallel branches in the structure, and wherein the N+1$^{th}$ branch is used to maintain operation of the modular STS when one of the first N branches is broken and fail to open circuit.

A second aspect of the present disclosure provides a method of transferring power supplied to a load from a first power source to a second power source. The method comprises providing instructions to electrically decouple the first power source from the load, verifies that the first power source is disconnected from the load, and provides instructions to electrically couple the second power source to the load.

A third aspect of the present disclosure provides a non-transitory computer-readable medium having processor-executable instructions stored thereon, wherein the processor-executable instructions, when executed by one or more processors, facilitate: providing instructions to electrically decouple the first power source from the load, verifying that the first power source is disconnected from the load, and providing instructions to electrically couple the second power source to the load.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIG. 5 shows a parallel connection of two SiC STS building blocks with the illustrative assembly and the circuit topology, according to one or more examples of the present disclosure;

DETAILED DESCRIPTION

Figure 1:
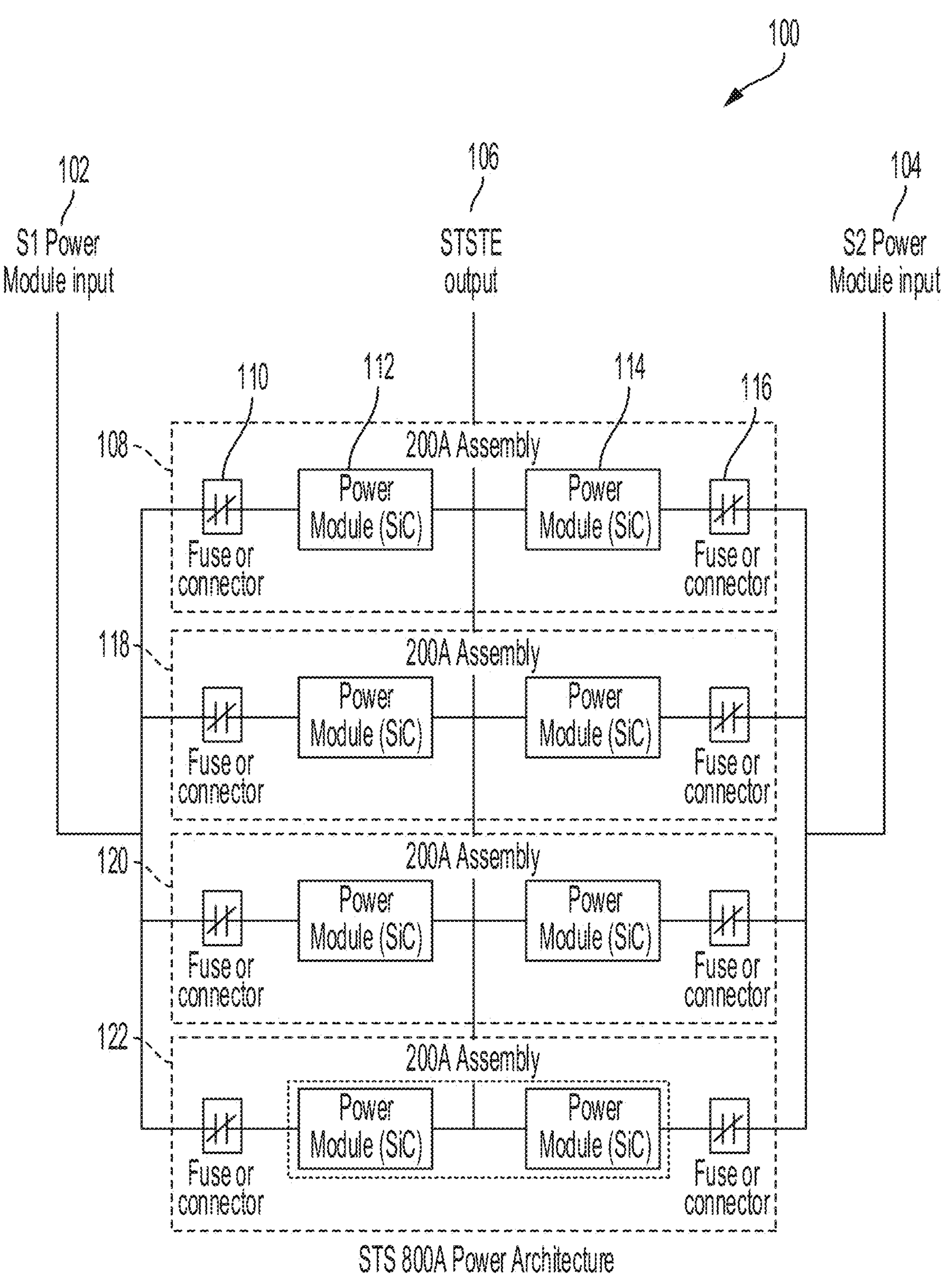
FIG. 1 illustrates a simplified circuit diagram for a modular static transfer switch, according to one or more examples of the present disclosure.

Existing static transfer switches (STS) use thyristor power modules and heatsink modules. Using thyristor modules to generate STS of various designs that may be rated for 200 A/250 A, 400 A, or 600 A requires a large amount of parts in production and service, which creates logistics and supply chain issues. Furthermore, thyristor power modules are prone to thermal runaways because of their negative temperature coefficient. Thyristors also cannot be used in parallel to create modular STS designs because when two thyristors are connected in parallel, the hot thyristor draws more current, becomes hotter, and eventually damaged. Additionally, thyristors are half-controlled semiconductors that cannot be turned off before external current reversal. In fact, there is usually a turn-off delay of up to 8 milliseconds in a 60 Hz system using thyristor-based STS. This turn-off delay is not desired in the next-generation, mission-critical systems.

This present disclosure presents a modular static transfer switch (STS) topology constructed with wide-bandgap transistor devices for mission-critical systems. A scalable STS with modular building blocks can make design, production, and service more efficient. An ultrafast STS can better support customer needs by quickly transferring between sources in case of a power outage. The present disclosure uses high-power transistor devices in modular STS designs, including but not limited to wide-bandgap transistors such as Field-Effect Transistors (FET) like metal oxide field-effect transistors (MOSFETs), junction field effect-transistors (JFETs), insulated-gate bipolar transistors (IGBTs), gate injection transistors (GITs), high-electron mobility transistors (HEMTs), etc. In some embodiments, the wide-bandgap transistors can be made with various semiconductor materials, including but not limited to silicon, silicon carbide (SiC), gallium nitride (GaN), diamond (C), etc. To achieve the modularity, the transistor modules are organized in individual assemblies, and multiple assemblies may be connected in parallel to achieve a higher current rating. To achieve the ultrafast transfer, the transistor modules can actively turn off within 500 microseconds after receiving the turn-off command.

In some embodiments, a static transfer switch of the present disclosure includes semiconductor powertrains constructed with wide-bandgap transistors. The wide-bandgap transistors are parallel-connected in each STS modular assembly, and multiple STS modular assemblies can be further parallel-connected to achieve a higher current rating in the overall STS. The wide-bandgap transistors can be turned off immediately upon the transfer command so that ultrafast transfer operations can be achieved. In some embodiments, each STS modular assembly has at least two inputs that connect both a preferred power source and a secondary power source. In some embodiments, the cooling system of each STS modular assembly gets shared by multiple input sources to increase the utilization and reduce the total volume. In some other implementations, the cooling system may be shared between various STS modules to increase utilization of the cooling system. In some cases, the galvanic isolators like relays and contactors are connected in series with transistors in each STS modular assembly, so that a faulty assembly can be disconnected, and the system may keep operating by utilizing an N+1 redundancy. As is understood, the N+1 redundancy provides a minimal level of resiliency by adding a single additional STS module to the existing architecture of N STS modules to support a failure or allow an STS module to be serviced without interrupting function of the STS.

FIG. 1 illustrates a simplified circuit diagram for a modular static transfer switch, according to one or more examples of the present disclosure. Circuit diagram 100 of FIG. 1 includes a first power module input (S1) 102 and a second power module input (S2) 104. The two power module inputs 102 and 104 are connected to two inputs of an STS building block 108. The first power module input 102 is connected to a first power module 112 of the STS building block 108 via a first fuse or contactor 110. Similarly, the second power module input 104 is connected to a second power module 114 of the STS building block 108 via a second fuse or contactor 116. The first power module 112 and the second power module 114 of the STS building block 108 are connected to an STS tied output 106. In some embodiments, the first power module 112 and the second power module 114 include power trains comprising wide-bandgap transistors. In some embodiments, the first power module input 102 is connected to the STS TIE output 106 via the first power module 112 and may be used to provide power to a load connected to the STS TIE output 106. Upon receiving instructions from a controller, the STS building block 108 may transfer from the first power module input 102 to the second power module input 104. In some cases, in transferring from the first power module input 102 to the second power module input 104, the first STS building block 108 turns off the first power module 112 and turns on the second power module 114. In this way, the first power module input 102 is disconnected from the STS TIE output 106 and the second power module input 104 is connected to the STS TIE output 106. In some embodiments, the transfer may be accomplished using a transfer algorithm. STS blocks 118, 120, and 120 are similar to the STS block 108.

In some embodiments, a voltage clamping circuit is connected in parallel to the semiconductor powertrain of the STS building block 108. During the process of transferring power provided to a load from a first power module input 102 to the second power module input 104, when the semiconductor switches associated with the first power module 112 are turned off, the current commutates to the voltage clamping circuit, and the voltage clamping circuit brings the current down to zero.

The purpose of the voltage clamping circuit is to reduce the current to zero while preventing the voltage developed across the semiconductor powertrain from exceeding the maximum voltage rating of the semiconductor devices used in the powertrain.

If a voltage clamping circuit isn't used, the voltage across the semiconductor powertrain can increase to dangerous levels and damage the semiconductors being used.

For the purposes of this disclosure, the STS building block 108 may be considered to have a rating of 200 A. In some embodiments, the capacity of a modular STS is easily increased by connecting the STS building blocks 118, 120, 122 in parallel as shown in FIG. 1. In some embodiments, two STS blocks 108 and 118 may be connected in parallel to achieve a current rating of 400 A, three STS blocks 108, 118, and 120 may be connected in parallel to achieve a rating of 600 A, and four STS blocks 108, 118, 120, and 122 may be connected in parallel to achieve a rating of 800 A. It will be understood that the STS blocks 108 and 118-122 may be constructed using wide-bandgap transistors to achieve any current rating desired. The peripheral gate drivers and control circuits of the STS architecture are changed accordingly to accommodate the operations of the wide-bandgap transistors in the STS blocks.

Wide-bandgap transistors used within the STS block 108 can be connected in parallel in STS architecture because wide-bandgap transistors such as FET like metal oxide field-effect transistors MOSFET have a positive temperature coefficient that is beneficial for parallel connections. In some embodiments, the use of wide-bandgap semiconductor transistors like Silicon Carbide (SiC) MOSFETs in the first power module 112 and the second power module 114 achieves low-enough conduction loss as a thyristor powertrain. Parallel-connected MOSFETs behave like parallel resistors to automatically balance the current sharing. The MOSFETs are fully controlled devices and have immediate turn-on and turn-off capabilities upon command. The turn-off delay of actively turned-off STS with MOSFETS is less than 0.5 milliseconds which reduces the total transfer time when transferring from the first power source input 102 to the second power source input 104. In this manner, the MOSFET-based STS can achieve modularity and ultrafast transfer. In each STS building block 108, 118, 120, and 122, the SiC MOSFET devices can be connected in parallel to reduce the power loss and enhance the overload withstand capability. In some embodiments, SiC MOSFET devices can also be connected in series to reach a higher voltage rating.

Figure 2:
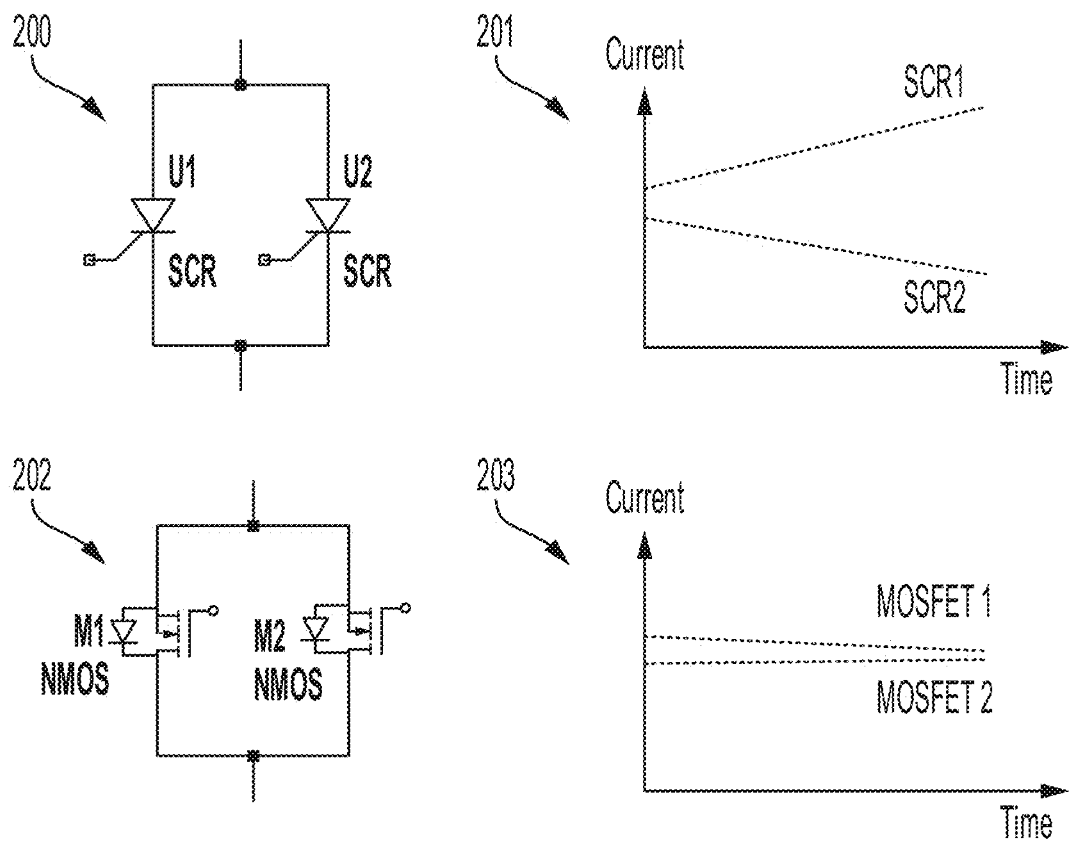
FIG. 2 depicts graphs related to operations of a modular static transfer switch, according to one or more examples of the present disclosure.

FIG. 2 depicts graphs related to operations of a modular static transfer switch, according to one or more examples of the present disclosure. FIG. 2 depicts a circuit diagram 200 that depicts two parallel thyristors. Graph 201 includes plots current sharing between two parallel thyristors with time. From circuit diagram 200 and graph 201, it is understood that thyristors are prone to thermal runaways because of their negative temperature coefficient. Additionally, when two thyristors are connected in parallel, the thyristor that heats up will draw more current and become hotter, and eventually will be damaged.

Circuit diagram 202 of FIG. 2 depicts two parallel MOSFETs and graph 203 plots the current sharing between two parallel MOSFETs with time. From the graph 203, it is understood that MOSFETs always have positive thermal coefficients. Because MOSFETs have positive thermal coefficients, MOSFETs can be parallel-connected and parallel-connected MOSFETs behave like paralleled resistors to automatically balance the current sharing.

Figure 3:
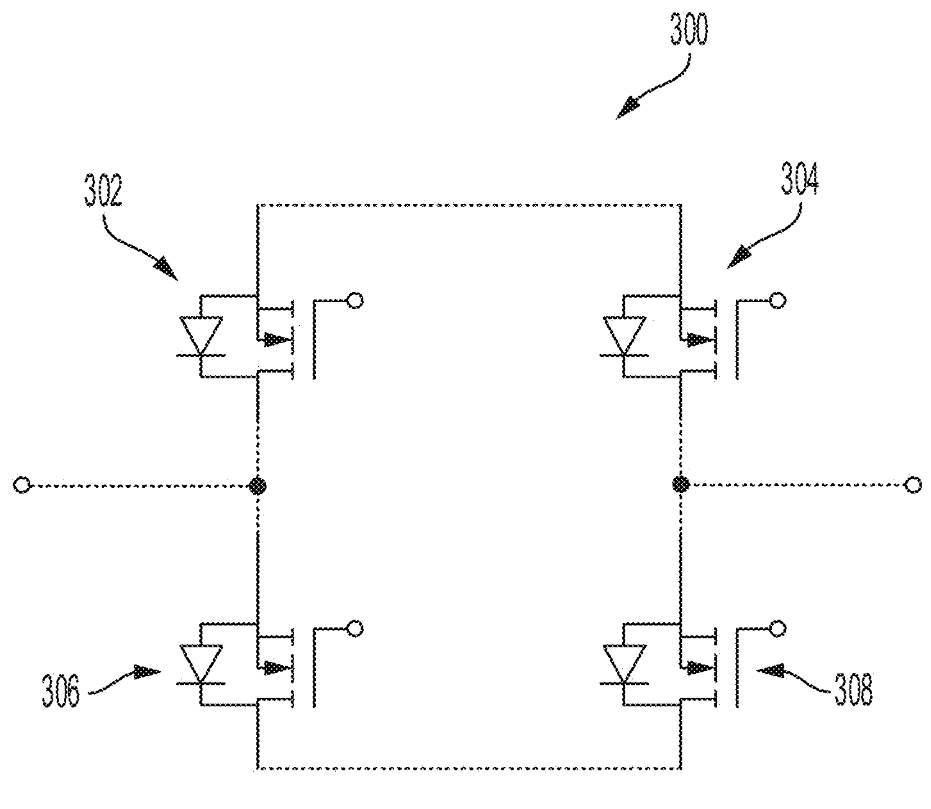
FIG. 3 shows the topology of a one-phase STS circuit consisting of two parallel branches of MOSFET devices, according to one or more examples of the present disclosure.

FIG. 3 shows the topology of one-phase circuit consisting of two parallel branches of MOSFET devices, according to one or more embodiments of the present disclosure. FIG. 3 depicts a circuit diagram 300 that includes four solid state switches (e.g., MOSFET devices) 302, 304, 306, and 308. A first level of modularity of the STS composed of switches is shown in FIG. 3. Switches or MOSFETs 302 and 304 are connected in a source-to-source anti-series connection. Switches 306 and 308 are connected in a source-to-source anti-series connection as well. In some embodiments, the connection of switches 302 and 304 or 306 and 308 correspond to one phase of multi-phase current. In some other cases, the connection of 304 and 304 or 306 and 308 can correspond to a primary power source and a secondary power source respectively, as shown below. The source-to-source anti-series connection allows for bidirectional current conduction when both MOSFETs (e.g., 302 and 304 or 306 and 308) are turned on and bidirectional voltage blocking when both MOSFETs (e.g., 302 and 304 or 306 and 308) are turned off. The parallel connection of two branches is used to reduce the total conduction loss of all MOSFETs. In some embodiments, compared to using only one branch of two anti-series MOSFETs (e.g., 302 and 304), using two branches of four anti-series MOSFETs (e.g., 302, 304, 306, and 308) can reduce the total power loss by 50%. Similarly, adding more branches in parallel can further reduce the total conduction loss of MOSFETs, subsequently making MOSFET power loss comparable with conventional thyristor power loss at equivalent current conduction.

Figure 4:
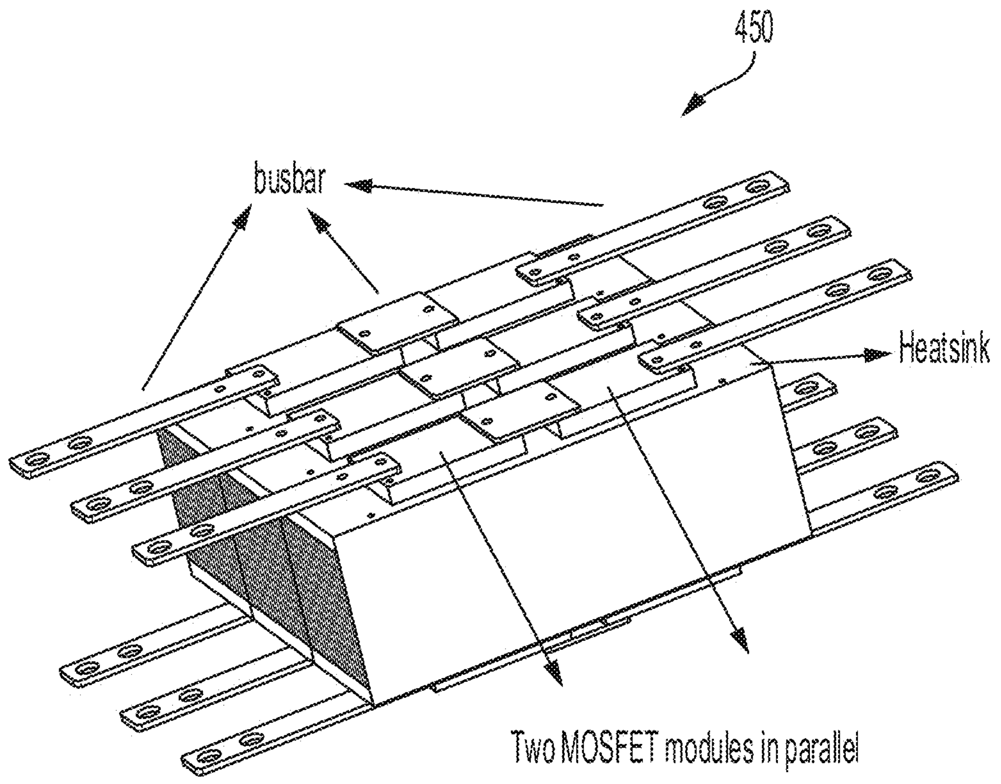
FIG. 4 depicts assemblies of a STS with different phase configurations of Silicon Carbide (SiC) MOSFETs, according to one or more embodiments of the present disclosure.

FIG. 4 depicts assemblies of STS with different phase configurations of SiC MOSFETs, according to one or more embodiments of the present disclosure. Diagram 450 depicts the powertrain assembly of one STS building block with six SiC MOSFET modules for the primary power source three phases on one side of a heatsink, and the other three phases of the secondary power source on the other side of heatsink.

FIG. 5 shows a parallel connection of two SiC STS building blocks with the illustrative assembly and the circuit topology, according to one or more embodiments of the present disclosure. FIG. 5 depicts a diagram 500 that shows a power train assembly of two STS SiC building blocks. The circuit diagram 550 corresponding to a STS building block of the power train assembly is also shown in FIG. 5.

A second level of modularity is introduced in the STS design by parallel connection of each STS building block that can connect two phases. Circuit diagram 550 depicts a first STS SiC block 552 and a second STS SiC block 554 with six phases each. In the STS SiC block 552, there are three phases (A/B/C) for the primary power source and the other three phases (a/b/c) are for the secondary power source. Similarly, in the STS SiC block 554, there are three phases (A'/B'/C') for the primary power source and the other three phases (a'/b'/c') are for the secondary power source. When the STS building blocks 552 and 554 are connected in parallel, phase A of the first building block 552 is shorted to phase A' of the second STS block 554. Other phases are tied together accordingly. By connecting two STS building blocks 552 and 554 in parallel, the overall current capacity of an STS is increased by 100%. And the STS current capacity can be further increased by paralleling more building blocks made with SiC MOSFETs. The busbars for paralleling STS building blocks are carefully designed to equalize the inductance and resistance across all parallel paths to equalize current sharing. In some embodiments, the design of an STS building block can be adapted to accommodate different phases of a multi-phase current. For example, for a single phase current, the number of phases in STS building block 552 may be reduced to one, with 4 solid-switches as shown in FIG. 3.

The design of the STS building blocks shown in circuit diagram 550 of FIG. 5 introduces three benefits, namely, ultrafast transfer, efficiency boost at light load, and mechanical integration.

Figure 6A:
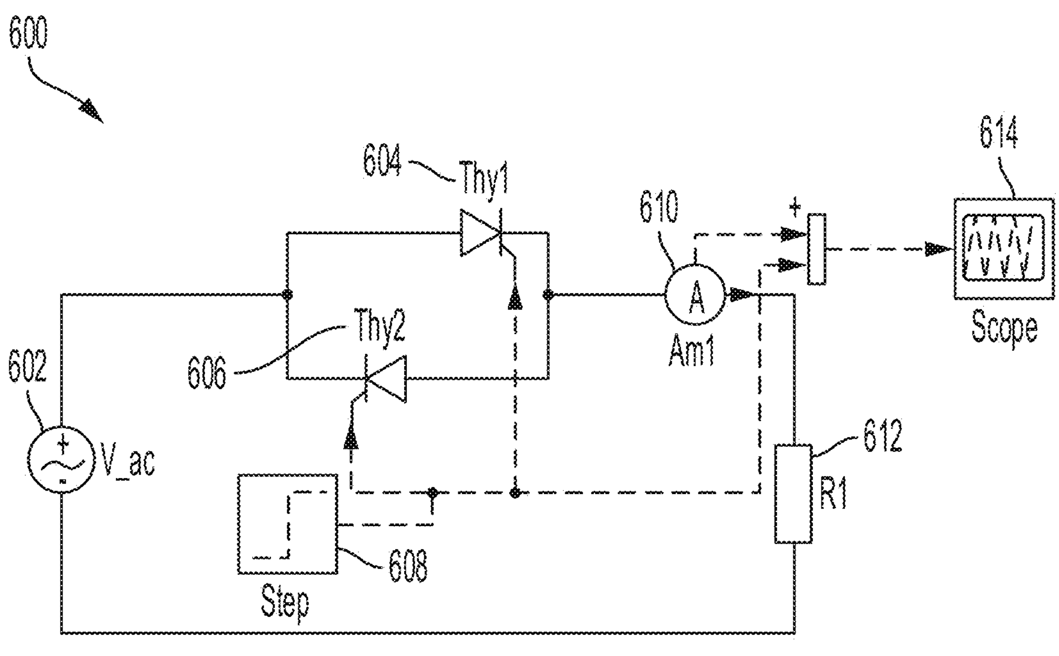
FIGS. 6A-6D shows the comparison of current interruption waveforms between a thyristor-based powertrain and a MOSFET-based powertrain, according to one or more examples of the present disclosure.
Figure 6B:
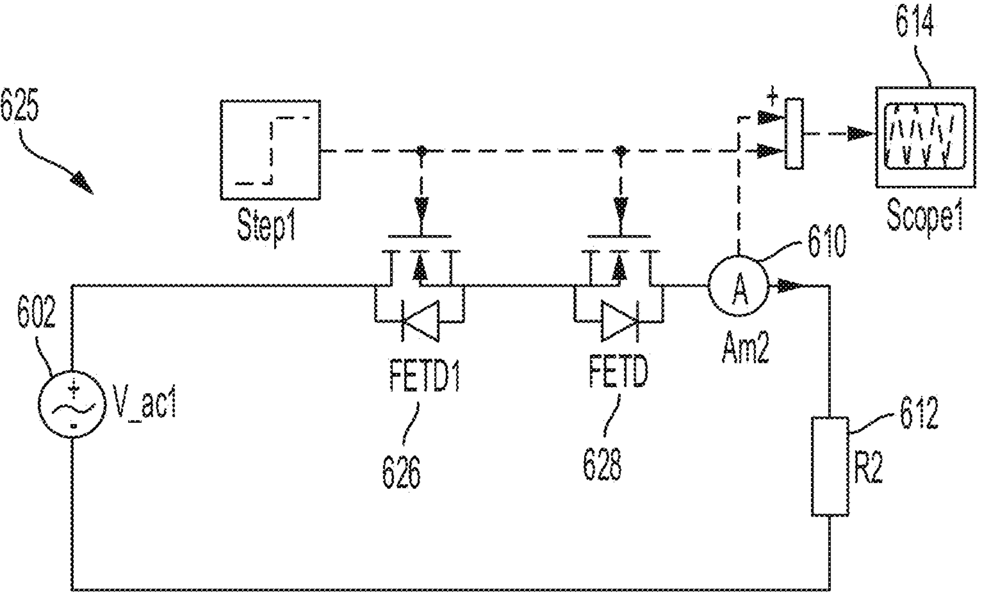
Figure 6C:
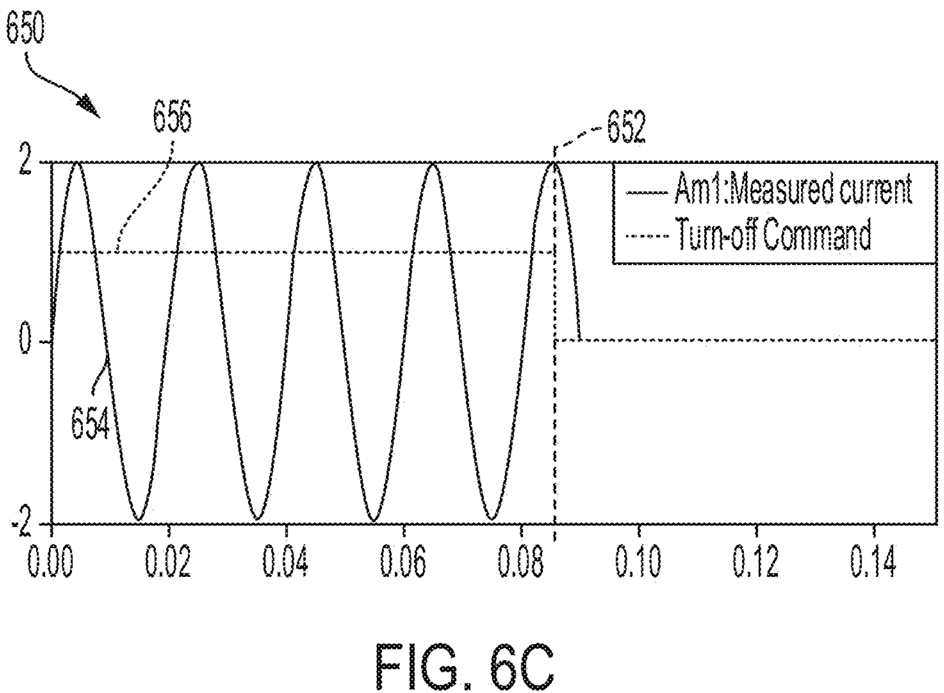
Figure 6D:
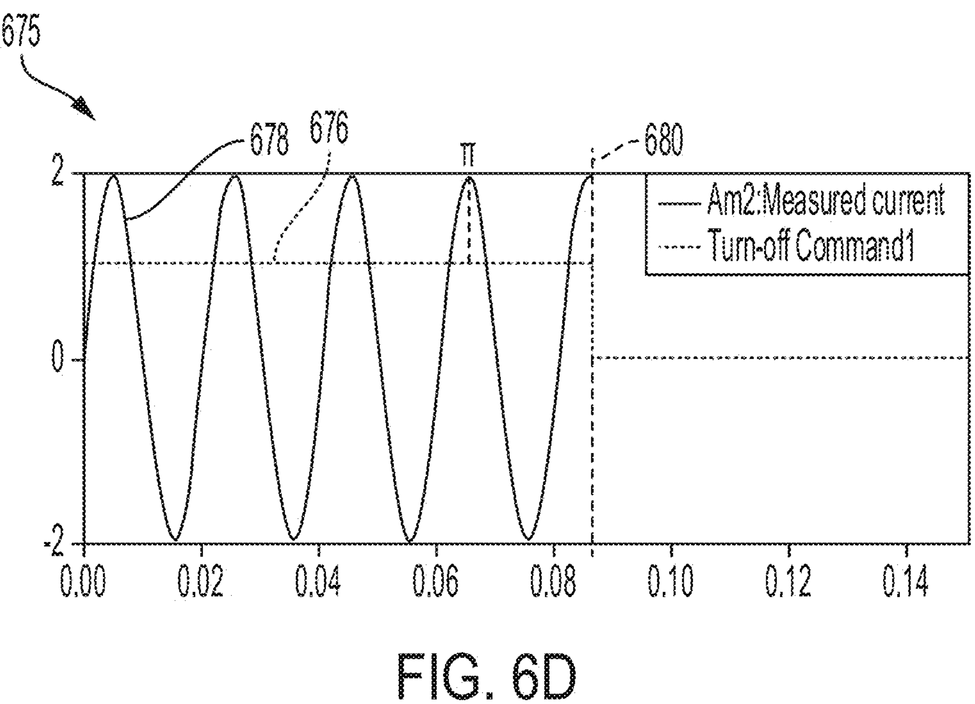

FIGS. 6A-6D show the comparison of current interruption waveforms between a thyristor-based powertrain and a MOSFET-based powertrain, according to one or more embodiments of the present disclosure. FIG. 6 demonstrates the benefit of ultrafast transfers introduced by a MOSFET-based STS building block. FIG. 6A includes a first circuit diagram 600 for a thyristor-based powertrain and FIG. 6B depicts a circuit diagram 625 for a MOSFET-based powertrain. FIG. 6C includes a first graph 650 corresponding to the thyristor-based powertrain depicted in circuit diagram 600 and FIG. 6D depicts a graph 675 for the MOSFET-based powertrain depicted in circuit diagram 625.

The first circuit diagram 600 depicts a voltage source 602 that is used to power two thyristors 604 and 606 connected in parallel. The parallel connection of the two thyristors 604 and 606 is connected to a current sensor 610 and a resistor 612 in series. A step signal is provided to thyristors 604 and 606 via 608 and a scope 614 measures the current through the current sensor 610 and the step signal provided by 608. In some embodiments, the step signal provided to the thyristors by 608 controls the operation of the thyristors. For example, if a step value 1 is provided to one or both of the thyristors 604 and 606, one or both of the thyristors are turned on. Alternatively, if a step value 0 is provided to one or both of the thyristors 604 and 606, one or both of the thyristors are turned off.

The different signals measured by scope 614 in circuit diagram 600 are plotted in graph 650. In graph 650, curve 654 plots the current sensed from current sensor 610 and curve 656 plots the step signal as provided to the thyristors 604 and 606 and provided by 608. As can be seen from the graph 650, the step signal 656 changes from 1 to 0 at time 652, which implies that the thyristors 604 and 606 were turned off at time 652. In response to the thyristors 604 and 606 being turned off, the current signal 654 does not turn off immediately at time 652. Instead the current signal 654 continues until it hits zero value and only turns off at zero value. This is because thyristors are only half-controlled and can only be turned off when the direction of current is reversed, as discussed previously.

The second circuit diagram 625 is similar to circuit diagram 600, except the thyristors 604 and 606 are replaced with MOSFETs 626 and 628 connected in series respectively. The remaining elements of the circuit 625 are similar to the circuit diagram 600. As in circuit diagram 600, a step signal is provided by 608 to the MOSFETs 626 and 628. The scope 614 measures the current from current sensor 610 and the step signal provided by 608. Similar to circuit diagram 600, the step signal provided to the MOSFETs by 608 controls the operation of the MOSFETs. For example, if a step value 1 is provided to one or both of the MOSFETs 626 and 628, one or both of the MOSFETs are turned on. Alternatively, if a step value 0 is provided to one or both of the MOSFETs 626 and 628, one or both of the MOSFETs are turned off.

The different signals measured by scope 614 in circuit diagram 625 are plotted in graph 675. In graph 675, curve 678 plots the current sensed from current sensor 610 and curve 676 plots the step signal as provided to the MOSFETs 626 and 628 and provided by 608. As can be seen from the graph 675, the step signal 676 changes from 1 to 0 at time 680, which implies that the MOSFETs 626 and 628 were turned off at time 680. In response to the MOSFETs 626 and 628 being turned off, the current signal 678 turns off almost immediately at time 680. This is because MOSFETs are only fully-controlled and can be turned off and on upon receiving the commands, as discussed previously.

In some embodiments, the turn off time for a thyristor-based STS is almost 8 milliseconds, and the turn off time for a MOSFET-based STS is approximately 0.5 milliseconds. This saves valuable time when operating high speed circuits.

Figure 7:
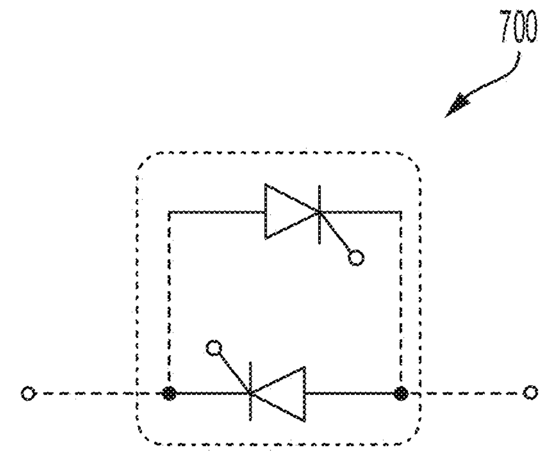
FIG. 7 depicts circuit diagrams of thyristor and MOSFET based STS to calculate power loss, according to one or more examples of the present disclosure.
Figure 7:
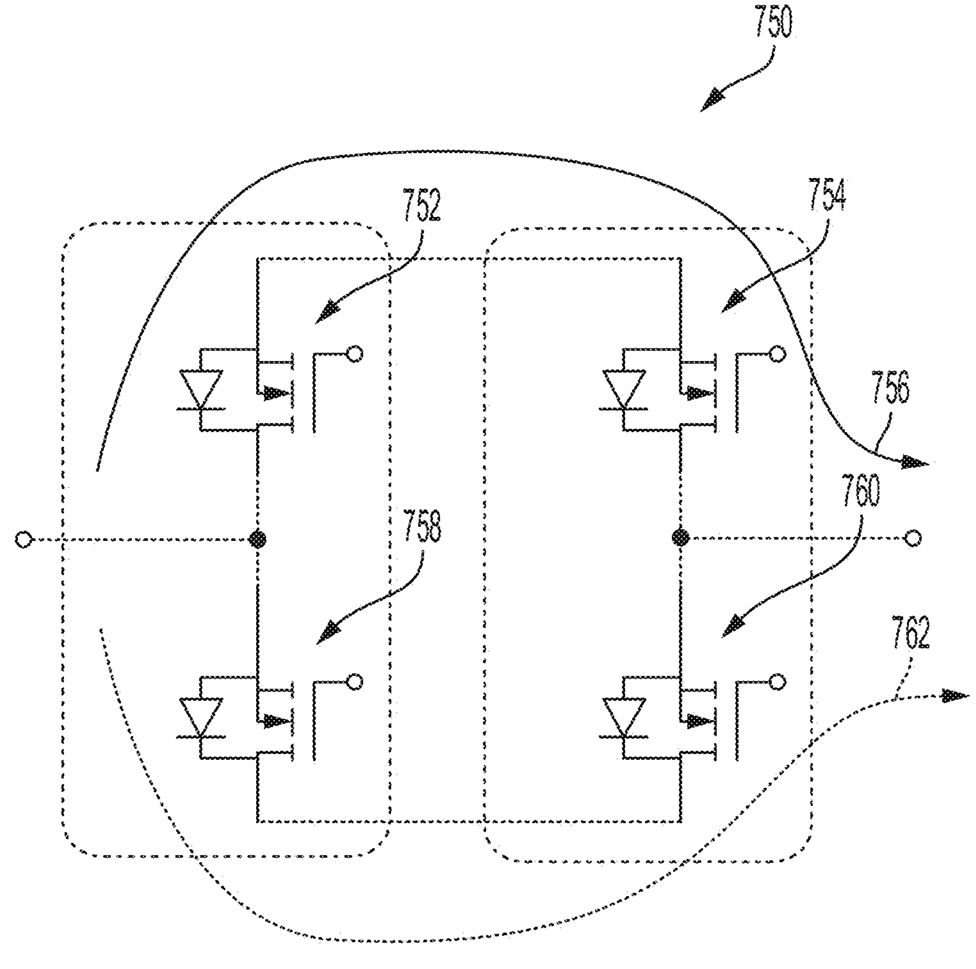

The second benefit of MOSFET-based STS is the efficiency boost at light load. An exemplary calculation on the conduction loss of a thyristor powertrain and a MOSFET powertrain under a light 50% load (i.e., 125 A conduction for a 250 A-rated STS) is shown below. The circuit diagrams corresponding to the thyristor powertrain and the MOSFET powertrain are shown in FIG. 7. Circuit diagram 700 depicts the circuit diagram for an exemplary thyristor powertrain of the STS. The exemplary thyristor-based STS circuit has the following parameters:

TABLE 1

| Key parameters of Thyristor based STS | |
|---|---|
| $V_{DRM}/V_{RPM}$ | 1600 V |
| $I_{TAVM}$ | 600 A ($T_c$ = 85° C.) |
| $I_{TSM}$ | 2100 A |
| $V_{T0}$ | 0.8 V |
| $r_T$ | 0.23 mΩ |
| $R_{thJC}$ | 0.055 K/W |
| Base plate | 60 mm |

Using the parameters listed in Table 1, a forward voltage drop per phase of a thyristor-based STS is calculated by adding the fixed voltage drop ($V_{T0}$) across the thyristor along with voltage created across the thyristor when 125 A is passed through the thyristor, as listed in the operating condition above.

$$\text{Forward Voltage drop per phase} = (V_{T0} + r_T \cdot I)$$

Using the above equation, the voltage drop per phase is calculated as 0.83 V+0.25 mΩ×125 A=0.83 V. After the forward voltage drop per phase is calculated, the power loss per phase is calculated using the following equation:

$$\text{Power loss per phase} = \text{Voltage drop per phase} \cdot I$$

Using the above equation, the power loss per phase is calculated as 125 A×0.83 V=104 W.

The MOSFET powertrain based STS circuit is shown in circuit diagram 750 of FIG. 7. As shown in circuit diagram 750, the current may flow through MOSFETs 752 and 754 as shown by arrow 756 or through MOSFETs 758 and 760, as shown by arrow 762. The exemplary MOSFET-based STS circuit has the following parameters:

TABLE 2

| Key parameters of MOSFET based STS | |
|---|---|
| Rating | 1200 V, 450 A |
| $R_{ds,on}$ | 3.8 mΩ |
| | Each MOSFET, 125 C |

Using the parameters listed in Table 2, the current through either train of MOSFETs is determined to be 62.5 A, which is half of the total current 125 A. Using the current determined through the MOSFET train, the power loss of the MOSFET-based STS can be calculated using the following equation:

$$\text{Power loss per MOSFET}=I^2 R_{ds,on}$$

Using the above equation, the power loss per MOSFET is calculated as 62.52 A×0.0038Ω=14.8 W. Using the power loss per MOSFET, the total power loss per STS is calculated by multiplying the power loss per MOSFET (14.8 W) with the number of MOSFETs in the circuit (4). The total power loss in the MOSFET based STS is determined to be 14.8×4=59 W. As can be seen from the calculations, the power loss in the MOSFET-based STS is almost 40% less than the power loss in the thyristor-based STS when operating at 50% load.

Figure 8:
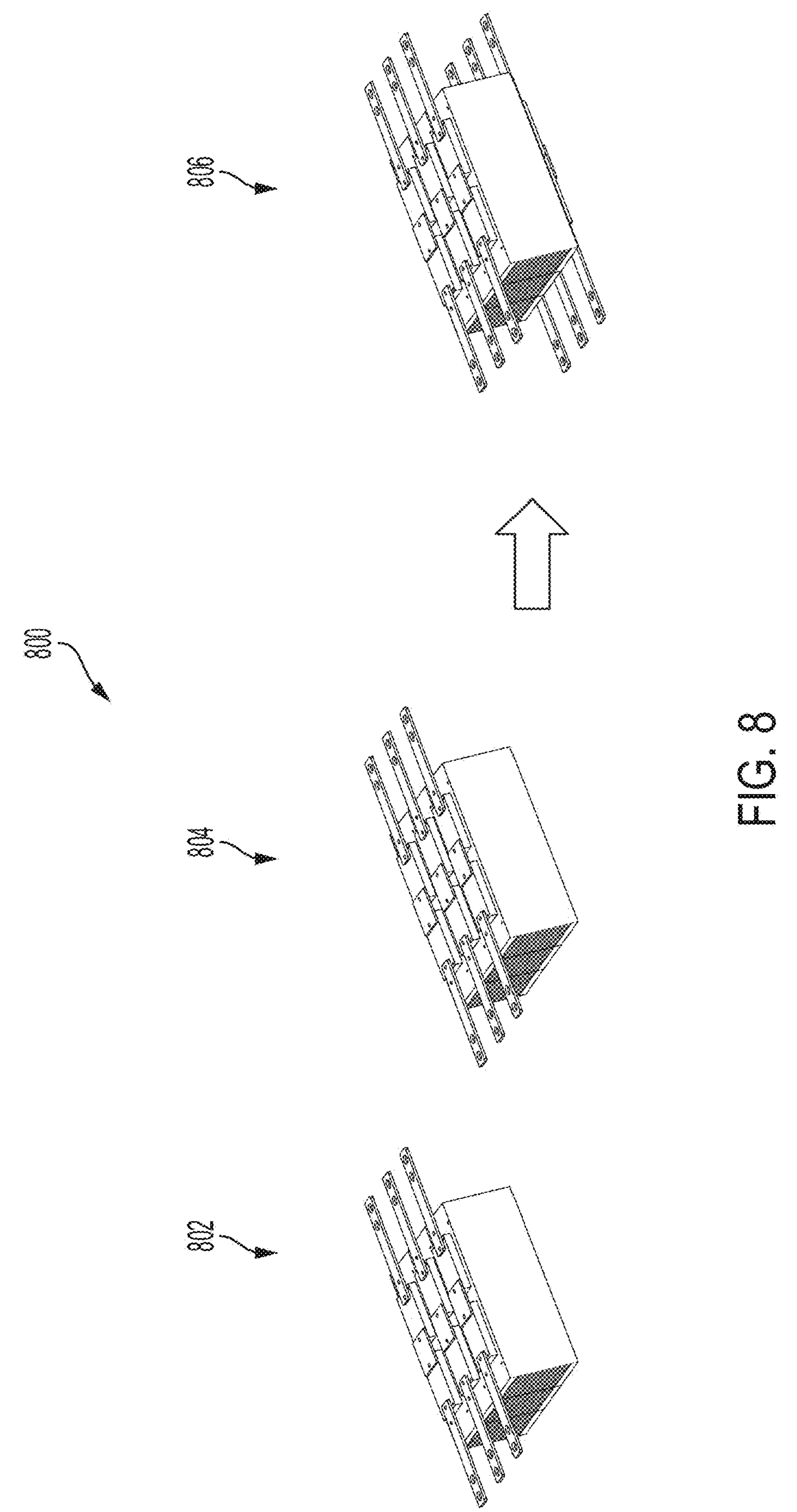
FIG. 8 depicts a mechanical configuration of thyristor and MOSFET based STS, according to one or more examples of the present disclosure.
Figure 9:
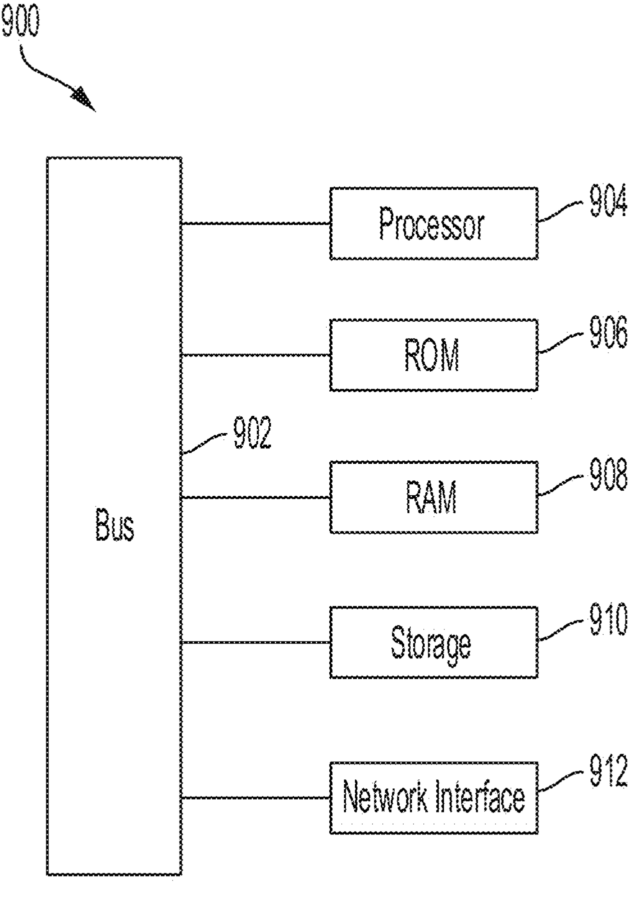
FIG. 9 is a simplified block diagram of one or more devices or systems within the exemplary environment of FIG. 10, according to one or more examples of the present disclosure.

The third benefit of a MOSFET based STS highlights the innovation of mechanical integration. Instead of having each assembly with a separate pair of heatsinks and fans, this design shares the same fan flow between two assemblies and reduces the total heatsink volume by 50%. This reduction considers that during STS operation only one assembly of semiconductors conducts at a specific time and the other assembly of semiconductors is turned off. FIG. 8 highlights the mechanical integration as described above. Diagram 802 and 804 of FIG. 9 depicts STS systems with separate pair of heatsinks and fans as used in a thyristor-based STS. Diagram 806 depicts a MOSFET-based STS that shares the same fan flow between two assemblies and reduces the total heatsink volume by 50%. In some embodiments, diagrams 802 and 804 depict two separate assemblies that are connected to two different sources. For example, the thyristor-based STS depicted in 802 may be configured to be connected to a preferred source, and the thyristor-based STS depicted in 804 may be configured to be connected to a secondary back up source. On the other hand, the MOSFET based STS depicted in diagram 806 is configured to connect to both the preferred source and the secondary back source simultaneously.

Thus, using a MOSFET powertrain, a modular STS is constructed by combining multiple building blocks in series or parallel. For example, as discussed above, the different building blocks are connected in series to increase the voltage rating of the STS architecture. The different STS building blocks may be connected in parallel to increase the current capacity of the STS architecture.

Each STS building block has an individually controlled semiconductor powertrain. In some embodiments, a first semiconductor of the semiconductor powertrain connects the primary source to the load and a second semiconductor of the semiconductor powertrain connects the secondary source to the load. The semiconductors in the semiconductor powertrain use high-power transistors to conduct line current when turned on and isolate line voltage when turned off. In some embodiments, the semiconductor powertrain can actively interrupt line current upon commanding before the external current reversal.

In some examples, the high-power transistors include but are not limited to MOSFETs, JFETs, IGBTs, GITs, HEMTs, and FinFETs. The high-power transistors are made of silicon and wide bandgap semiconductor materials including but not limited to SiC, GaN, etc. A relay or contactor can be connected in series with semiconductors to facilitate galvanic isolation of the faulty (shorted) semiconductors and maintain STS operation under N+1 redundancy. In some cases, a suitably designed powertrain allows for equal sharing of line current across all the parallel branches per phase of the STS.

In some embodiments, the STS building block can use discrete power semiconductor devices, customized bidirectional power modules, standard half-bridge modules, or standard full bridge modules. In some embodiments, the STS building block can have heatsink assemblies in one phase per heatsink, three phases per heatsink, or six phases per heatsink. When multiple STS building blocks are connected in parallel, it may be suitable to put all parallel limbs of the STS on the same heatsink to provide better isolation from the other phases and reduce the busbar inductance.

FIG. 9 is a block diagram of an exemplary system or device 900 within the system 1000 such as the controller 1004. The system 900 includes a processor 904, such as a central processing unit (CPU), and/or logic, that executes computer executable instructions for performing the functions, processes, and/or methods described herein. In some examples, the computer executable instructions are locally stored and accessed from a non-transitory computer readable medium, such as storage 910, which may be a hard drive or flash drive. Read Only Memory (ROM) 906 includes computer executable instructions for initializing the processor 904, while the random-access memory (RAM) 908 is the main memory for loading and processing instructions executed by the processor 904. The network interface 912 may connect to a wired network or cellular network and to a local area network or wide area network. The system 900 may also include a bus 902 that connects the processor 904, ROM 906, RAM 908, storage 910, and/or the network interface 912. The components within the system 900 may use the bus 902 to communicate with each other. The components within the system 900 are merely exemplary and might not be inclusive of every component within the controller 904. Additionally, and/or alternatively, the system 900 may further include components that might not be included within every entity of system 900. For instance, in some examples, the controller 1004 might not include a network interface 912.

Figure 10:
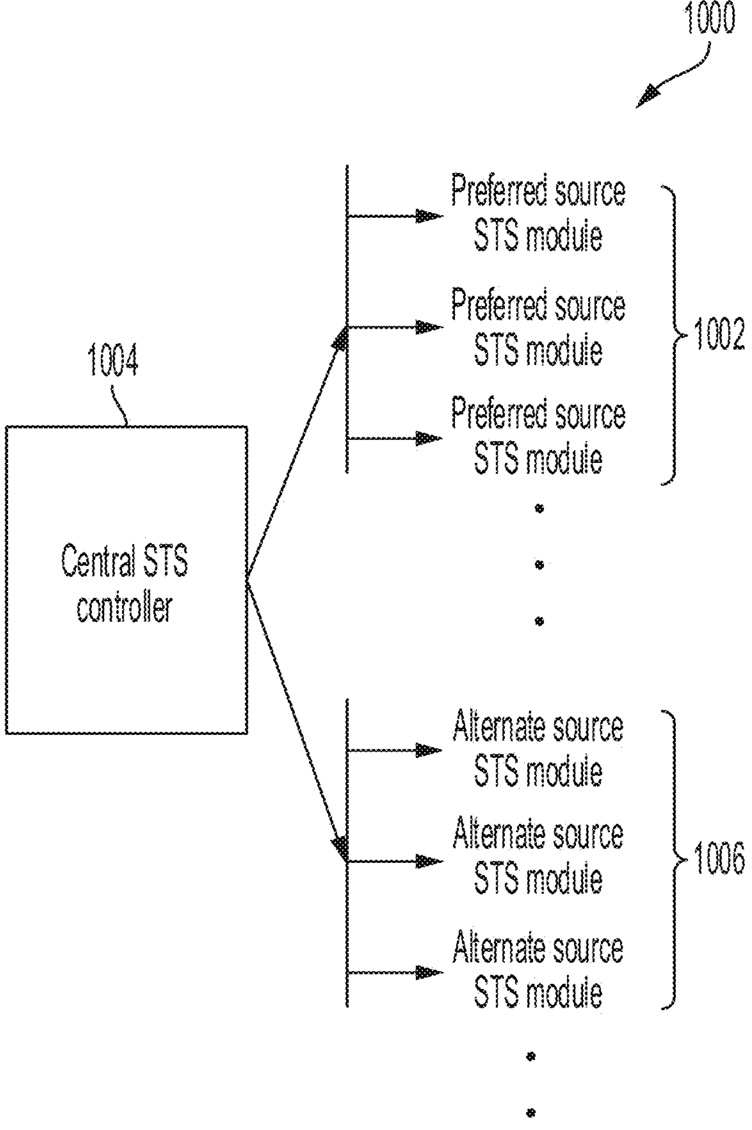
FIG. 10 illustrates a simplified block diagram depicting a system for a modular static transfer switch, according to one or more examples of the present disclosure.

FIG. 10 illustrates a simplified block diagram depicting a system for a modular static transfer switch, according to one or more examples of the present disclosure. FIG. 10 includes a system 1000 that includes a preferred source STS modules 1002 and alternate source STS modules 1006. The system 1000 also includes a central STS controller 1004 that controls operation of the STS. In some embodiments, the central STS controller 1004 provides instruction to the preferred source STS modules 1002 and alternate source STS modules 1006. The controller 1004 may be configured to operate the preferred source STS modules 1002 and the alternate source STS modules 1006.

In some embodiments, the preferred source STS modules 1002 may be connected to a preferred power source input and the alternate source STS modules 1006 may be connected to an alternate source power input. The central controller 1004 may be used to power a load using one of the preferred power source input and the alternate power source input. For example, in order to power the load using the preferred STS module 1002, the central controller 1004 may instruct the preferred source STS modules 1002 to be active and connect the preferred power source input to the load. Upon receiving signals from the preferred power source input, the central controller 1004 may initiate the switching process from the preferred power source input to the alternate power source input. In some embodiments, the switching between the preferred power source input and the alternate power source input may be governed by switching or transfer algorithms. The process of the switching between the preferred power source input and the alternate power source input is described in more detail in FIG. 11.

Figure 11:
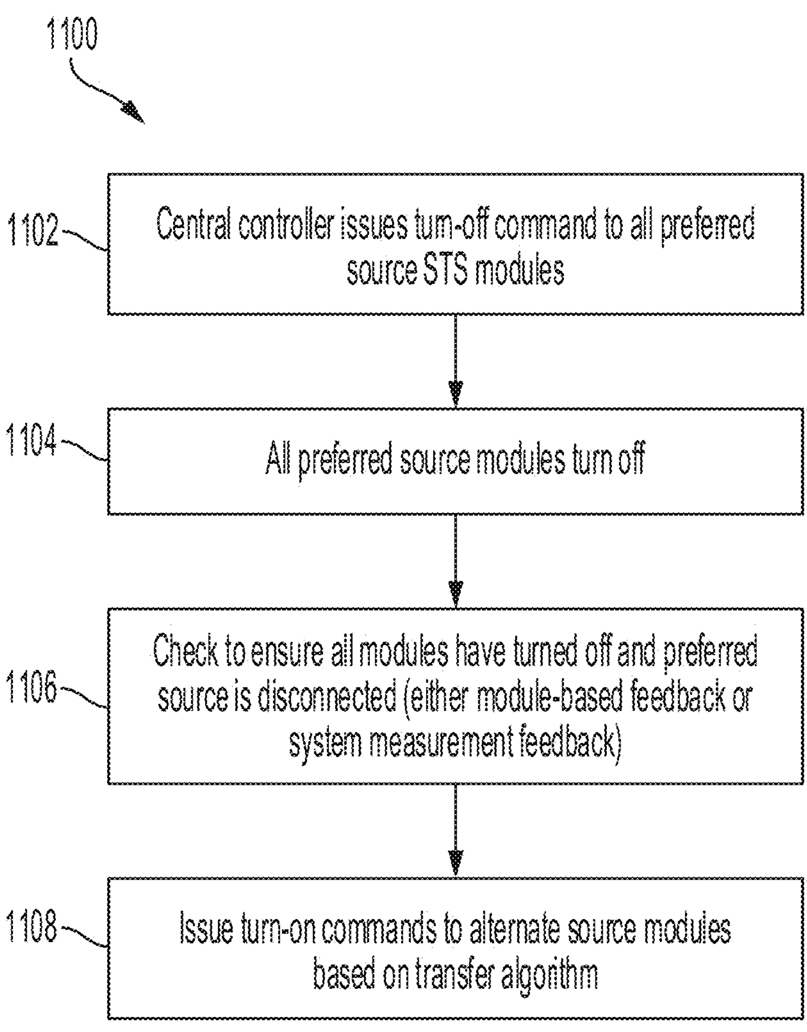
FIG. 11 illustrates a process performed by a controller as part of a modular static transfer switch, according to one or more examples of the present disclosure.

FIG. 11 illustrates a process performed by a controller as part of a modular static transfer switch, according to one or more examples of the present disclosure. The process 1100 may be performed by the controller 1004 of system 1000 shown in FIG. 10. However, it will be recognized that any of the following blocks may be performed in any suitable order and that the process 1100 may be performed in any environment and by any suitable computing device and/or controller.

At 1102, the central controller 1004 issues turn-off command to all preferred source STS modules. In some embodiments, the turn-off command may be issued based on signals received by the central controller 1004 from the preferred power source input. For example, the central controller 1004 may receive, from the preferred power source input, a signal that indicates a fault in the preferred power source input. In response to receiving the indication of the fault, the central controller 1004 may initiate the transfer from the preferred power source input 1002 to the alternate power source input 1006. In order to initiate the transfer from the preferred power source input to the alternate power source input, the central controller 1004 instructs the preferred STS modules to turn-off. By turning off, the STS severs connection between the load and the primary power source input.

At 1104, upon receiving the the instruction from the central controller 1004, the preferred source modules are turned-off. Once the instruction is provided by the central controller 1004, the preferred STS source STS modules are turned off.

At 1106, the controller 1004 checks to ensure that all preferred source modules are turned off and the preferred source is disconnected from the STS. In some embodiments, the check to ensure all modules have turned off is performed using a module-based feedback or system measurement based feedback.

At 1108, the controller 1004 issues turn on commands to alternate source modules based on a transfer algorithm. The transfer algorithm calculates the transformer magnetic flux before and after the transfer to find the first time moment when the flux change is minimal. In some embodiments, many transfer algorithms may be used. In one case, the transfer algorithm disconnects from the preferred source and then reconnects all three phases of the alternate source simultaneously. In another case, where a transformer may be connected downstream, the transfer algorithm uses the measured voltages from the preferred and alternate source, estimates the transformer flux, and performs the transfer to minimize inrush current during transfer.

In some embodiments, the turning on of the alternate source STS module 1006 connects the alternate power source input to the load via the STS 1000.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. For example, the various embodiments of the kinematic, control, electrical, mounting, and user interface subsystems can be used interchangeably without departing from the scope of the invention. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A modular static transfer switch (STS) assembly, wherein the modular STS assembly comprises:

at least one semiconductor powertrain constructed with at least two wide-bandgap transistors, wherein the at least two wide-bandgap transistors are connected in source-to-source anti-series, wherein the at least one semiconductor powertrain includes a turn-off delay period;

an STS building block including a first power source and a second power source;

a first input of the modular STS assembly electrically coupled to the first power source of the STS building block and a second input of the modular STS assembly electrically coupled to the second power source of the STS building block, wherein the first power source is connected to a first terminal of a first wide-bandgap transistor of the at least one powertrain via the first input, and the second power source is connected to a first terminal of a second wide-bandgap transistor of the at least one powertrain via the second input;

an output of the modular STS assembly electrically coupled to a load, wherein the load is powered using the first power source of the STS building block, wherein the output of the modular STS assembly is connected to a second terminal of the first wide-bandgap transistor and a second terminal of the second wide-bandgap transistor; and a galvanic isolator like relay or contactor or breaker or fuse to disconnect any faulty semiconductor powertrain;

a controller to execute the transfer of power supplied to the load from the first power source to the second power source and within the STS building block of one of the at least two semiconductor powertrains, wherein the controller is configured to:

issue transfer turn-off instructions to the STS building block to electrically decouple the first power source from the load within the turn-off delay period, wherein the turn-off delay period is less than 0.5 milliseconds after the issuance of the turn-off instructions;

verify that the first power source is disconnected from the load; and issue transfer turn-on instructions to electrically couple the second power source to the load.

2. The modular static transfer switch assembly of claim 1, wherein the wide-bandgap transistors comprise at least one of MOSFETs, JFETs, IGBTs, GITs, HEMTs, FinFETs.

3. The modular static transfer switch assembly of claim 1, further comprising:

a second semiconductor powertrain constructed with wide-bandgap transistors, wherein the second semiconductor powertrain comprises two wide-bandgap transistors in an anti-series connection.

4. The modular static transfer switch assembly of claim 3, wherein the at least one semiconductor powertrain and the second semiconductor powertrain are connected in parallel.

5. The modular static switch assembly of claim 3, wherein the at least one semiconductor powertrain is connected to the first power source and the second semiconductor powertrain is connected to the second power source.

6. The modular static switch assembly of claim 4, wherein the at least one semiconductor powertrain connected in parallel to the second semiconductor powertrain is a first STS unit, and further comprising:

a second STS unit, wherein the second STS unit comprises a third semiconductor power train and a fourth semiconductor power train, wherein the third semiconductor powertrain is connected to the at least one semiconductor powertrain and the fourth semiconductor power train is connected to the second semiconductor powertrain.

7. The modular static switch assembly of claim 4, wherein the at least one semiconductor powertrain connected in parallel to the second semiconductor powertrain is a first STS unit, and further comprising:

a second STS unit, wherein the second STS unit comprises a third semiconductor power train and a fourth semiconductor power train, wherein the third semiconductor powertrain is connected to a second phase of the first power source and the fourth semiconductor power train is connected to the second phase of the second power source.

8. The modular static transfer switch assembly of claim 3, wherein the at least one semiconductor powertrain and the second semiconductor powertrain are connected in series.

9. The modular static transfer switch assembly of claim 1, wherein the at least one semiconductor powertrain comprises one or more four quadrant or bidirectional wide-bandgap transistors, and wherein the wide-bandgap transistors comprise at least one of MOSFETS, JFETs, IGBTs, GITs, HEMTs, FinFETs.

10. The modular static transfer switch assembly of claim 1, wherein the modular STS has N+1 parallel branches in a structure, and wherein the N+1th branch is used to maintain operation of the modular STS when one of a first N branches is broken and fail to open circuit.

11. The modular static transfer switch of claim 1, further comprising a voltage clamping circuit connected in parallel to at least one semiconductor powertrain.

* * * * *